(No Model.) 2 Sheets—Sheet 2.

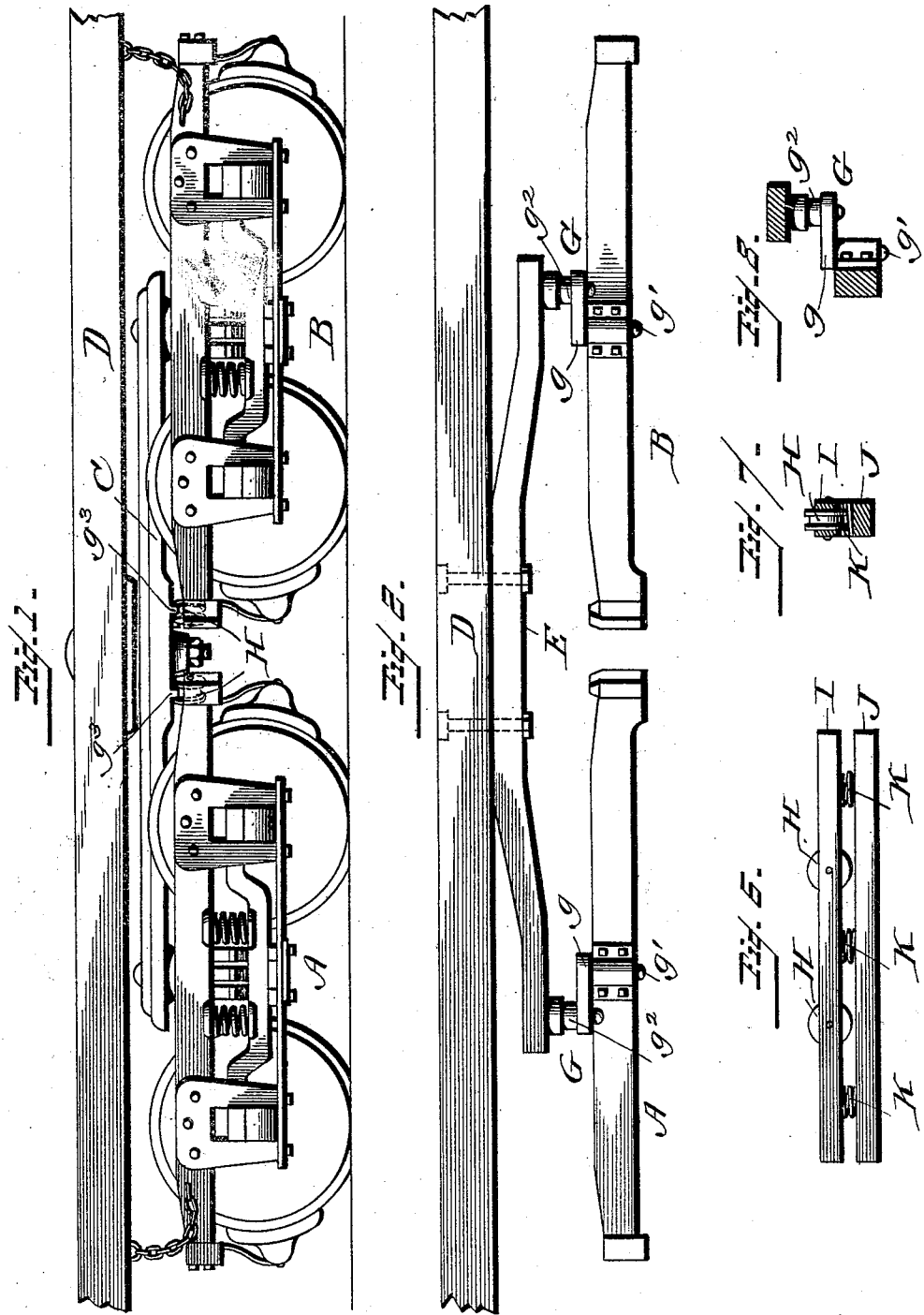

J. W. COOPER.
CAR TRUCK.

No. 513,889. Patented Jan. 30, 1894.

UNITED STATES PATENT OFFICE.

JOHN W. COOPER, OF GILBERT'S MILLS, NEW YORK.

CAR-TRUCK.

SPECIFICATION forming part of Letters Patent No. 513,889, dated January 30, 1894.

Application filed March 22, 1893. Serial No. 467,209. (No model.)

*To all whom it may concern:*

Be it known that I, JOHN W. COOPER, a citizen of the United States, residing at Gilbert's Mills, in the county of Oswego, State of New York, have invented certain new and useful Improvements in Car-Trucks; and I do hereby declare the following to be a full, clear, and exact description of the invention, such as will enable others skilled in the art to which it appertains to make and use the same.

The object of the present invention is to construct an eight wheel truck by combining together two four wheel trucks and admit of each four wheel truck having an independent movement whereby the wheels composing the eight wheel truck will adapt themselves to short curves in the track, thereby obviating the rigidity incident to the construction of the ordinary eight wheel truck in which the wheels obtain bearings in a single rigid frame.

The invention consists of the novel features and the peculiar construction and combination of the parts which will be hereinafter more fully described and claimed and which are shown in the annexed drawings, in which—

Figure 3:
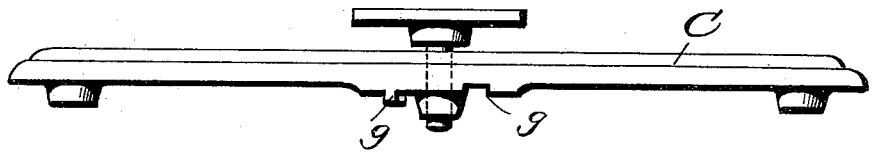
Figure 4:
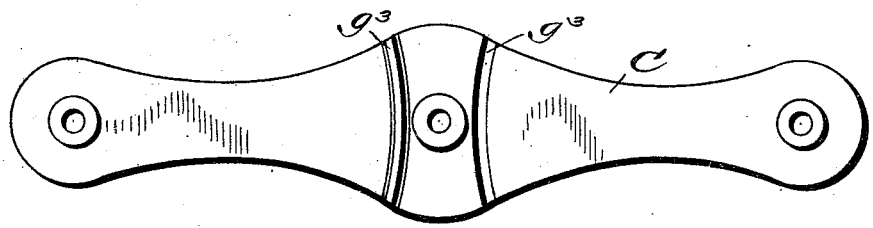
Figure 5:
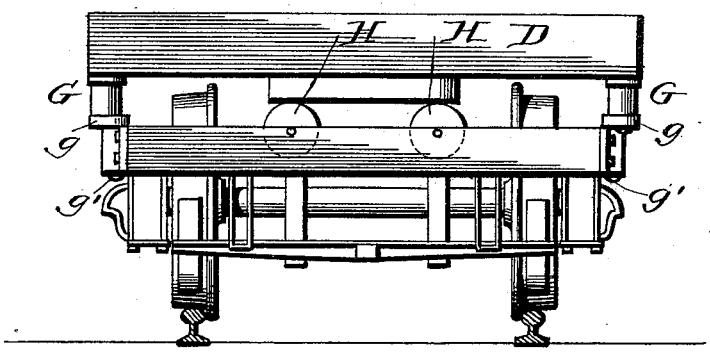

Figure 1 is a side elevation of an eight wheel truck embodying my invention showing its application. Fig. 2 is a side view showing a modification of the means for attaching the truck frame to the side beam of the car. Fig. 3 is a side view of the casting for spanding and connecting together the two frames of the four wheel trucks shown in Fig. 1. Fig. 4 is a bottom plan view of the casting shown in Fig. 3. Fig. 5 is an end view of the truck, showing the couplings on each side of the truck differently applied. Fig. 6 is an end view of a modified form of truck frame. Fig. 7 is a cross section of Fig. 6. Fig. 8 is a detail view of the coupling for connecting the truck frame and the car body.

In carrying the invention into successful operation two four wheel trucks A and B of ordinary construction are provided to form an eight wheel truck. A casting C is connected by king bolt midway of its ends to the car body D and is adapted to have pivotal connection at its ends with the said trucks A and B. These trucks A and B are connected at a central point, to the opposite ends respectively of the casting C, in such a manner as to have an independent motion whereby the four wheels on each side can change their relative position and adapt themselves to the curvature of the track and obviate undue friction and wear.

Instead of the construction shown in Fig. 1 side bars E may be provided as shown in Fig. 2 and the truck frames of the trucks A and B will have pivotal connection at a central point with the end of the said side beam E. The form of connection between the side bearing beams E and the truck frame is most clearly shown in Fig. 8 and consists of a coupling G. This coupling G comprises a base $g$ and oppositely extending pintles $g'$ and $g^2$ which project from opposite ends of the said base. The pintles $g'$ and $g^2$ may be solid or tubular. In the preferable form of construction the lower pintle is solid and obtains a bearing in a bearing block provided on the truck frame or beam E and the upper pintle is tubular to receive a journal depending from the car bottom on the beam E. By having the pintles $g'$ and $g^2$ at opposite ends of the base $g$ the car body and truck are adapted to have a lateral motion within certain limits owing to the pintles $g'$ and $g^2$ being out of the same vertical line and having pivotal connection with the truck frame and car body. This coupling G connects the truck frames with the ends of the casting C, the ends of the beams E or directly with the car body, the latter being shown in Fig. 5.

In order to give stability to the structure it has been found expedient to have the inner ends of the truck frames have direct contact with either the casting C or a portion of the car bottom, and to relieve friction which is incident to the oscillation of the trucks rollers H are interposed between the said truck frames and the part in engagement with the said frames. These rollers H are located in recesses formed in the truck frames and are preferably grooved to embrace the sides of a track as shown most clearly in Fig. 7. Instead of the raised track, as shown by the full lines to the left of the pivotal center of the casting in Fig. 3, a depressed track or groove may be provided as shown to the right of the said pivotal center in the said figure. It is immaterial whether these tracks are raised or depressed; the operation is the same. The tracks $g^3$ $g^3$ are formed on the arc of a circle whose center co-incides with the vertical axis about which the trucks turn. See Fig. 4.

In order to prevent jolting and admit of a slight yielding movement of the trucks in a vertical direction the truck frames will in some cases be made in two parts an upper part I and a lower part J, between which springs K will be interposed. See Figs. 6 and 7.

Having thus described my invention, what I claim, and desire to secure by Letters Patent, is—

1. An eight wheel truck for cars composed of two four wheel trucks of ordinary construction, and a coupling having oppositely extending pintles not in the same vertical line for connecting the said trucks with the car body, substantially as and for the purpose described.

2. The combination with a car and a truck, of two couplings, one on each side of the truck, having pintles at opposite ends and adapted to connect the truck with the car body, substantially as described.

3. An eight wheel truck composed of casting C having tracks $g$ $g$ two four wheel trucks pivotally connected to the ends of the said casting and having their inner ends constructed to travel upon the said tracks, substantially as described.

4. An eight wheel truck composed of casting C having tracks $g$ $g$, two four wheel trucks pivotally connected to the ends of the said casting and having their inner ends constructed to travel upon the said tracks, and rollers located in recesses in the frames of the said truck and adapted to run on the said tracks, substantially as described.

In testimony whereof I affix my signature in presence of two witnesses.

JOHN W. COOPER.

Witnesses:
F. DAVID,
A. F. BRYANT.